US008240522B2

(12) United States Patent
Newton et al.

(10) Patent No.: US 8,240,522 B2
(45) Date of Patent: Aug. 14, 2012

(54) DUAL FUNCTION DISPENSING HEAD FOR CARBONATED BEVERAGE MACHINE

(75) Inventors: John R. Newton, Vero Beach, FL (US); Michael E. Cheney, Vero Beach, FL (US); Peter J. Brooke, Micco, FL (US)

(73) Assignee: Global Agricultural Technology & Engineering LLC, Vero Beach, FL (US)

( * ) Notice: Subject to any disclaimer, the term of this patent is extended or adjusted under 35 U.S.C. 154(b) by 957 days.

(21) Appl. No.: 12/211,893

(22) Filed: Sep. 17, 2008

(65) Prior Publication Data

US 2009/0095770 A1 Apr. 16, 2009

Related U.S. Application Data

(60) Provisional application No. 60/980,191, filed on Oct. 16, 2007.

(51) Int. Cl.

| | |
|---|---|
| ***B65D 47/20*** | (2006.01) |
| ***B67D 3/00*** | (2006.01) |
| ***B67D 7/74*** | (2010.01) |
| ***G05D 16/08*** | (2006.01) |

(52) U.S. Cl. .................... 222/504; 222/129.1; 222/506; 222/517; 137/454.2; 137/505.41

(58) Field of Classification Search .............. 222/129.1, 222/129, 132, 165, 185.1, 386, 387, 505, 222/504, 506, 517, 518; 137/66, 494, 495, 137/505.41, 454.2, 505, 505.13, 505.18
See application file for complete search history.

(56) References Cited

U.S. PATENT DOCUMENTS

| | | | | |
|---|---|---|---|---|
| 2,174,515 | A | | 10/1939 | Hughes |
| 2,257,249 | A | | 9/1941 | Thomas |
| 2,359,111 | A | | 9/1944 | Hughes |
| 2,405,010 | A | | 7/1946 | Bucknam |
| 2,639,194 | A | | 5/1953 | Wahlinr |
| 2,746,471 | A | | 5/1956 | Cobb |
| 2,960,109 | A | | 11/1960 | Wilson |
| 3,229,714 | A | | 1/1966 | Raem |
| 3,294,290 | A | * | 12/1966 | Erickson et al. ............. 222/335 |
| 3,324,872 | A | | 6/1967 | Cloud |
| 3,424,196 | A | | 1/1969 | Donner |
| 3,557,831 | A | | 1/1971 | Katchka |
| 3,643,685 | A | | 2/1972 | Hays |
| 3,730,215 | A | | 5/1973 | Conery et al. |
| 3,730,773 | A | | 5/1973 | Graber |
| 3,746,036 | A | | 7/1973 | Du Bois et al. |

(Continued)

FOREIGN PATENT DOCUMENTS

| | | |
|---|---|---|
| CA | 530611 | 9/1956 |

(Continued)

*Primary Examiner* — Kevin P Shaver
*Assistant Examiner* — Stephanie E Williams
(74) *Attorney, Agent, or Firm* — Gesmer Updegrove LLP

(57) ABSTRACT

A dispensing head incorporates multiple constant flow valves for controlling the flow of multiple liquids, e.g., syrup and carbonated water fed to a dispensing nozzle. The valves are normally closed and are opened by inlet pressures above selected threshold levels. Once open, the valves maintain the liquid flows at substantially constant flow rates and pressures, irrespective of variations of liquid input pressures and viscosities. A closure mechanism serves to close the valves at inlet pressures both above and below the threshold levels. The closure mechanism may be deactivated to simultaneously allow the valves to assume their modulating functions at inlet pressures above the threshold levels.

9 Claims, 5 Drawing Sheets

U.S. PATENT DOCUMENTS

| | | | | |
|---|---|---|---|---|
| 3,782,410 | A | 1/1974 | Steuby | |
| 3,872,884 | A | 3/1975 | Busdiecker et al. | |
| 3,943,969 | A | 3/1976 | Rubin et al. | |
| 3,948,285 | A | 4/1976 | Flynn | |
| 4,074,694 | A | 2/1978 | Lee | |
| 4,080,993 | A | 3/1978 | Lind, Jr. | |
| 4,083,380 | A | 4/1978 | Huber | |
| 4,197,995 | A | 4/1980 | Campbell et al. | |
| 4,250,915 | A | 2/1981 | Rikuta | |
| 4,275,764 | A | 6/1981 | Baret | |
| 4,416,301 | A | 11/1983 | Brumm | |
| 4,437,493 | A | 3/1984 | Okuda et al. | |
| 4,498,471 | A | 2/1985 | Kranz et al. | |
| 4,508,140 | A | 4/1985 | Harrison | |
| 4,513,777 | A | 4/1985 | Wright | |
| 4,516,600 | A | 5/1985 | Sturman et al. | |
| 4,621,658 | A | 11/1986 | Buezis et al. | |
| 4,627,832 | A | 12/1986 | Hooven et al. | |
| 4,630,642 | A | 12/1986 | Detweiler | |
| 4,657,224 | A | 4/1987 | Lattuada | |
| 4,682,622 | A | 7/1987 | Weber | |
| 4,697,613 | A | 10/1987 | Wienck | |
| 4,729,762 | A | 3/1988 | Doumenis | |
| 4,796,660 | A | 1/1989 | Bron | |
| 4,838,305 | A | 6/1989 | Reinartz et al. | |
| 4,852,606 | A | 8/1989 | Heneker | |
| 4,867,198 | A | 9/1989 | Faust | |
| 5,033,648 | A * | 7/1991 | Nakayama et al. | 222/129.1 |
| 5,105,982 | A * | 4/1992 | Takahashi et al. | 222/82 |
| 5,137,522 | A | 8/1992 | Bron | |
| 5,234,025 | A | 8/1993 | Skoglund et al. | |
| 5,241,986 | A | 9/1993 | Yie | |
| 5,255,711 | A | 10/1993 | Reeds | |
| 5,303,734 | A | 4/1994 | Eidsmore | |
| 5,341,968 | A | 8/1994 | Vandoninck | |
| 5,383,489 | A | 1/1995 | Golestan et al. | |
| 5,524,670 | A | 6/1996 | Castle | |
| 5,529,090 | A | 6/1996 | Golestan et al. | |
| 5,597,012 | A | 1/1997 | Moinard | |
| 5,642,752 | A | 7/1997 | Yokota et al. | |
| 5,727,529 | A | 3/1998 | Tuckey | |
| 5,829,477 | A | 11/1998 | Graham et al. | |
| 5,862,952 | A * | 1/1999 | Lee | 222/146.6 |
| 5,988,211 | A | 11/1999 | Cornell | |
| 6,026,850 | A | 2/2000 | Newton et al. | |
| 6,209,578 | B1 | 4/2001 | Newton | |
| 6,564,971 | B2 * | 5/2003 | Heyes | 222/129.1 |
| 2008/0011365 | A1 | 1/2008 | Newton et al. | |

FOREIGN PATENT DOCUMENTS

| | | | |
|---|---|---|---|
| DE | 3703579 | A1 | 6/1988 |
| EP | 0475743 | | 3/1992 |
| GB | 732400 | | 6/1955 |
| GB | 1163585 | | 9/1969 |
| GB | 2006930 | | 5/1979 |
| GB | 2099112 | | 12/1982 |
| WO | WO2006/022455 | | 3/2006 |
| WO | 2006/101641 | | 9/2006 |

* cited by examiner

DUAL FUNCTION DISPENSING HEAD FOR CARBONATED BEVERAGE MACHINE

CROSS REFERENCE TO RELATED APPLICATION

This application claims priority from provisional application Ser. No. 60/980,191 filed on Oct. 16, 2007.

BACKGROUND DISCUSSION

1. Field of the Invention

This invention relates generally to machines for dispensing carbonated beverages, and is concerned in particular with a dual function dispensing head which insures a constant and fixed flow of each liquid component to the machine's diffusion and dispensing nozzle, coupled with on/off adjustment.

2. Description of the Prior Art

Conventional dispensing heads typically employ spring-loaded ceramic valves to control the flow of syrups and carbonated water to nozzles which serve to combine and dispense the liquids. The ceramic valves include mating sliding surfaces that are sensitive to variations in input pressures, liquid viscosities and sticky sugar syrups, resulting in non-uniform mix ratios and an uneven quality of the dispensed beverages. There are also much more expensive volumetric dispensing valves that electronically measure the flow rate of the carbonated water and then meter the syrup. These also suffer accuracy due to the variations in input pressures and viscosity.

In an attempt at alleviating this problem the conventional dispensing heads include means for manually adjusting flow rates to compensate for changing input pressures and viscosities. However, this entails constant attention and frequent recalibrations, and can lead to other problems, including accidental as well as intentional watering down of beverages by unscrupulous merchants.

SUMMARY OF THE INVENTION

In accordance with the present invention, a dual function liquid dispensing head comprises a housing defining multiple compartments aligned on parallel axes. Constant flow valves ("CFValves") are arranged in the housing compartments. The CFValves, which are of the type described in Published Patent Application No. US 2008/0016365 A1, the description of which is herein incorporated by reference, comprise barrier walls extending transversely across the compartment axes to subdivide the compartments into head sections and base sections. Ports in the barrier walls are aligned with the compartment axes. Modulating assemblies internally subdivide the base sections into liquid chambers and spring chambers. The modulating assemblies have throttle pins projecting along the compartment axes and through the ports into the head sections. Flexible diaphragms support the modulating assemblies for movement in opposite directions along the compartments. Springs in the spring chambers are responsive to inlet liquid pressures in the head sections below threshold levels to maintain the modulating assemblies in closed positions against the barrier walls, thereby preventing liquid flow from the head sections via the ports into the liquid chambers. The springs are yieldably responsive to inlet liquid pressures in the head sections above the valve threshold levels to thereby accommodate movement of the modulating assemblies to open positions spaced from the barrier walls, with an accompanying liquid flow from the head sections via the ports into the liquid chambers. The throttle pins serve to modulate the sizes of the flow paths through the ports as an inverse function of variations in the inlet liquid pressures above the threshold levels, thereby maintaining the pressures and flow rates of the liquids delivered to the liquid chambers at substantially constant levels. The housing includes inlets connecting the head sections to external liquid sources, and outlets connecting the liquid chambers to a common nozzle assembly. A closure mechanism acts independently of the springs to maintain the modulating assemblies in their closed positions when the inlet liquid pressures are both above and below the threshold levels. The closure mechanism may be deactivated to thereby free the modulating assemblies for movement to their open positions in response to liquid inlet pressures in the head sections above the threshold levels.

These and other features and advantages of the present invention will now be described in further detail with reference to the accompanying drawings, wherein:

DETAILED DESCRIPTION

Figure 1:
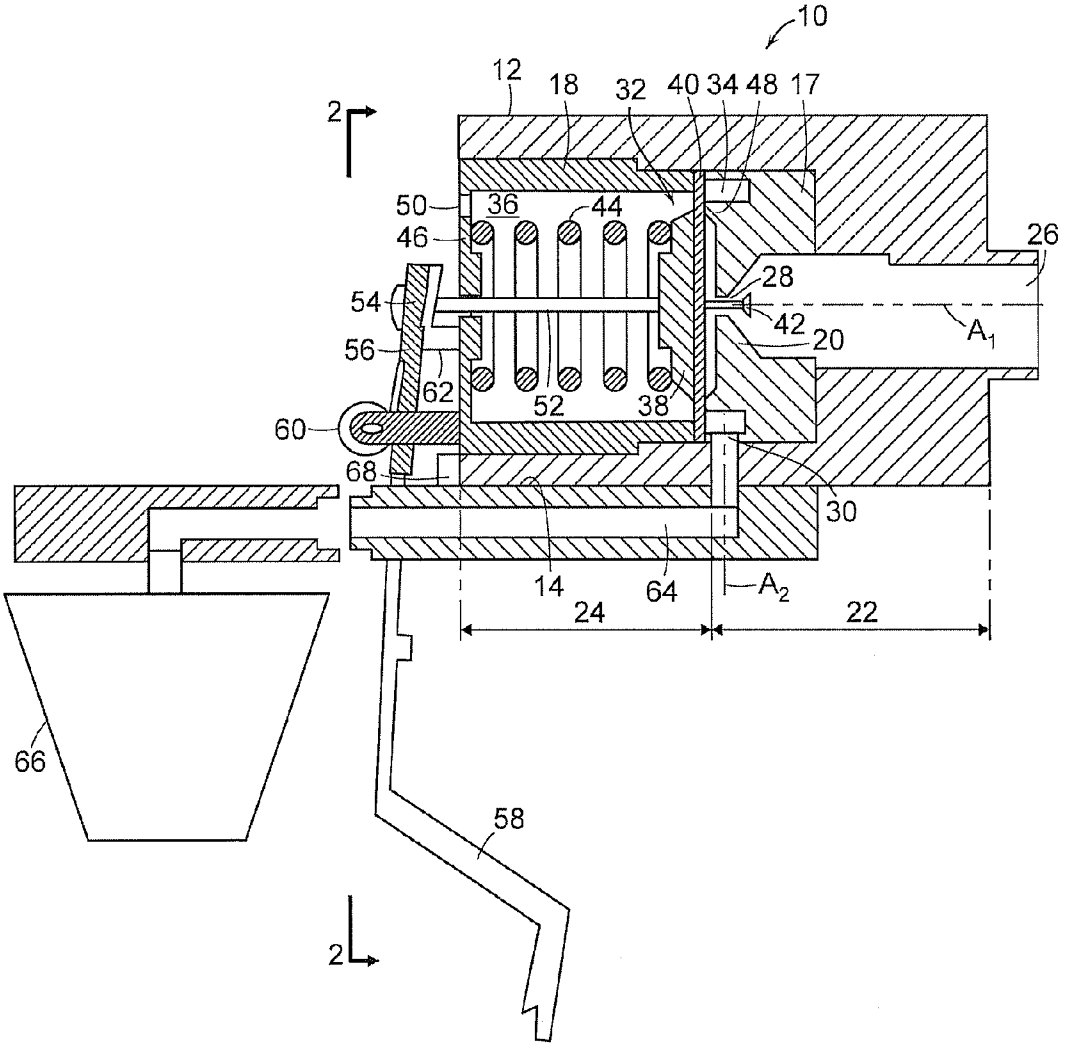
FIG. 1 is a partially exploded sectional view through one embodiment of a dispensing head in accordance with the present invention.
Figure 3:
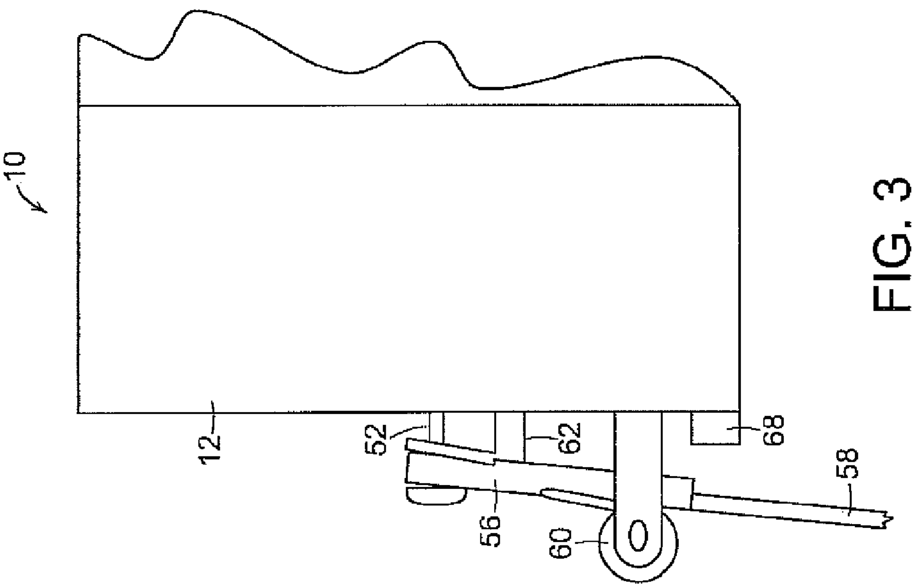
FIG. 3 is a side view of the dispensing head.
Figure 2:
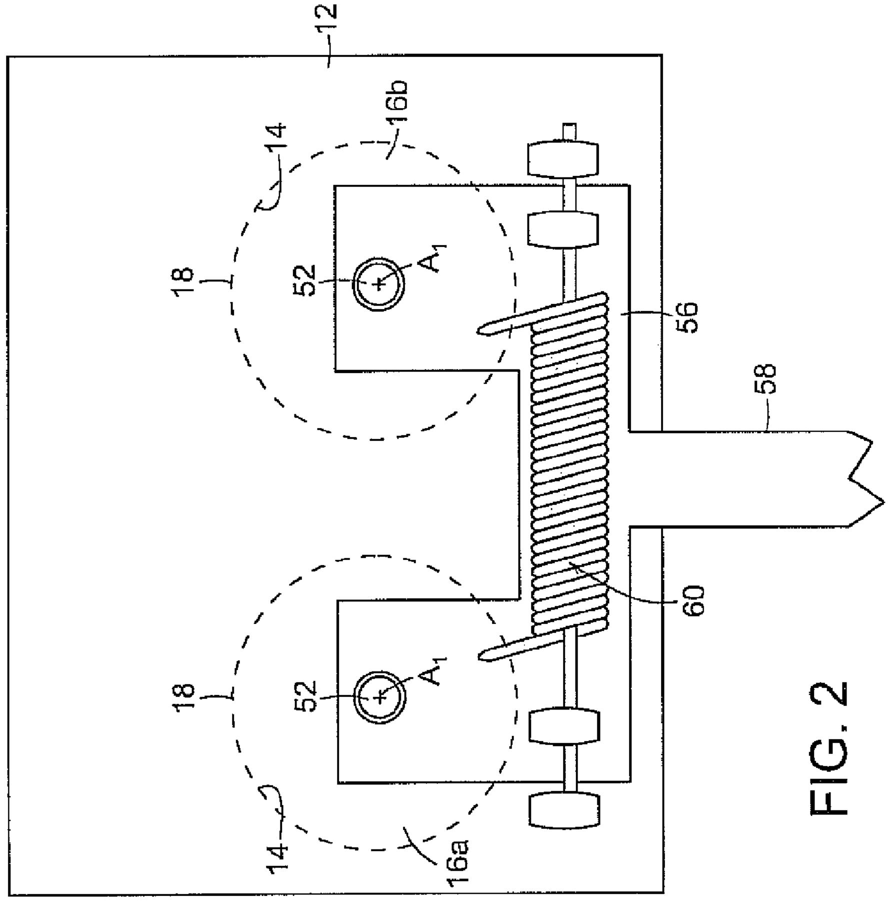
FIG. 2 is a view taken along line 2-2 of FIG. 1.

With reference initially to FIGS. 1-3, a dispensing head in accordance with one embodiment of the present invention is generally depicted at 10. The dispensing head has an outer housing 12 defining separate internal compartments 14 aligned on parallel axes $A_1$. CFValves 16*a*, 16*b* are arranged in the compartments 14. In the disclosed embodiment, CFValve 16*a* may be rated to control the flow of beverage syrup, and CFValve 16*b* may be rated to control the flow of carbonated water. Except for their different flow rates, the CFValves 16*a*, 16*b* are identically constructed, and thus the following description will serve to describe both.

As can best be seen in FIG. 1, each CFValve includes a cap 17 joined to a cup-shaped base 18.

The cap 17 defines a barrier wall 20 subdividing the compartment 14 into a head section 22 and a base section 24. An inlet 26 in the housing is adapted to be connected to a fluid supply (not shown), e.g. beverage syrup or carbonated water, having a pressure that can vary from below to above a threshold level. The inlet 26 and a central port 28 in the barrier wall 24 are aligned along the compartment axis $A_1$. An outlet port 30 in the housing is aligned on a second axis $A_2$ transverse to the first axis $A_1$.

A modulating assembly 32 cooperates with the barrier wall 20 to subdivide the base section 24 into a fluid chamber 34 segregated from a spring chamber 36. In its closed position, the modulating assembly serves to prevent fluid flow through the valve when the fluid pressure at the inlet 26 is below the threshold pressure. When the fluid pressure at the inlet exceeds the threshold pressure, the modulating assembly shifts to an open position and serves to accommodate fluid flow through port 28 into fluid chamber 34 at a constant pressure and flow rate, and from there through outlet port 30. Either the outlet port 30 or a downstream orifice or flow restrictor serves to develop a back pressure in fluid chamber 34.

The modulating assembly 32 includes a piston 38 carried by a flexible annular diaphragm 40 for movement in opposite directions between its open and closed positions along axis $A_1$.

A throttle pin 42 with a shaped head projects from piston 38 through the port 28 into the head section 22 communicating with inlet 26. The enlarged head on the throttle pin 42 has a tapered underside that coacts with a tapered edge surface of the barrier wall surrounding port 28 to modulate the size of the flow path through the port as an inverse function of the varying fluid pressure at the inlet 26, with the result being to deliver fluid through the fluid chamber 34 and outlet port 30 at a substantially constant pressure and flow rate, irrespective of variations in fluid pressure at the inlet, as well as variations in liquid viscosity.

A compression spring 44 in the spring chamber 36 is captured between an underside surface of piston 38 and the bottom wall 46 of the cup-shaped base 18. The spring 44 urges the modulating assembly 32 towards the barrier wall 20. When the fluid pressure at the inlet 26 is below the threshold pressure, spring 44 serves to hold the modulating assembly in its closed position, pressing the diaphragm 40 against a sealing ring 48 on the barrier wall 20, thus preventing fluid flow through the fluid chamber 34 to the outlet port 30. As the fluid pressure exceeds the threshold pressure, the resilient closure force of spring 44 is overcome, allowing the modulating assembly to move away from the sealing ring 48, into its open position, allowing the modulating function of the valve to commence. An opening 50 in the bottom wall 46 serves to vent the volume beneath diaphragm 40 to the surrounding atmosphere.

An actuating rod 52 projects through the bottom wall 46 to abut the base of piston 38. As can best be seen in FIGS. 2 and 3, the outer ends of the actuating rods 52 of both CFValves 16*a*, 16*b* are connected as at 54 to the laterally projecting fingers of a pivoted lever 56 having a downwardly projecting handle 58. A rotationally fixed torsion spring 60 serves to bias the lever 56 in a clockwise direction as viewed in FIG. 1. The biasing action of spring 60 overrides the flow control functions of the valve 16*a*, 16*b* at liquid inlet pressures both above and below the threshold levels of the valves, and thus serves to hold the modulating assemblies in their closed positions with the diaphragms 40 against the sealing ring 48 to prevent flow through the valves. A stop 62 limits clockwise movement of the lever 56 and thus safeguards the diaphragms 40 from being overly stressed.

By manually engaging the handle 58 and pivoting the lever 56 in a counter clockwise direction, the rods 52 of both CFValves 16*a*, 16*b* are withdrawn simultaneously from the pistons 38 of the modulating assemblies 32, thus allowing both valves 16*a*, 16*b* to assume their flow control functions. Fluid pressures from inlets 26 will serve to overcome the biasing action of springs 44, thereby deflecting the diaphragms 40 away from the sealing rings 48 into their open positions, allowing a controlled flow of liquid to pass through fluid chambers 34 to outlet ports 30.

The liquids then pass through passages 64 to the machine's diffusing and dispensing nozzle 66. Both CFValves 16*a*, 16*b* are opened and closed simultaneously by the pivotal action of lever 56. A stop 68 limits counter clockwise movement of the lever 56.

Figure 4:
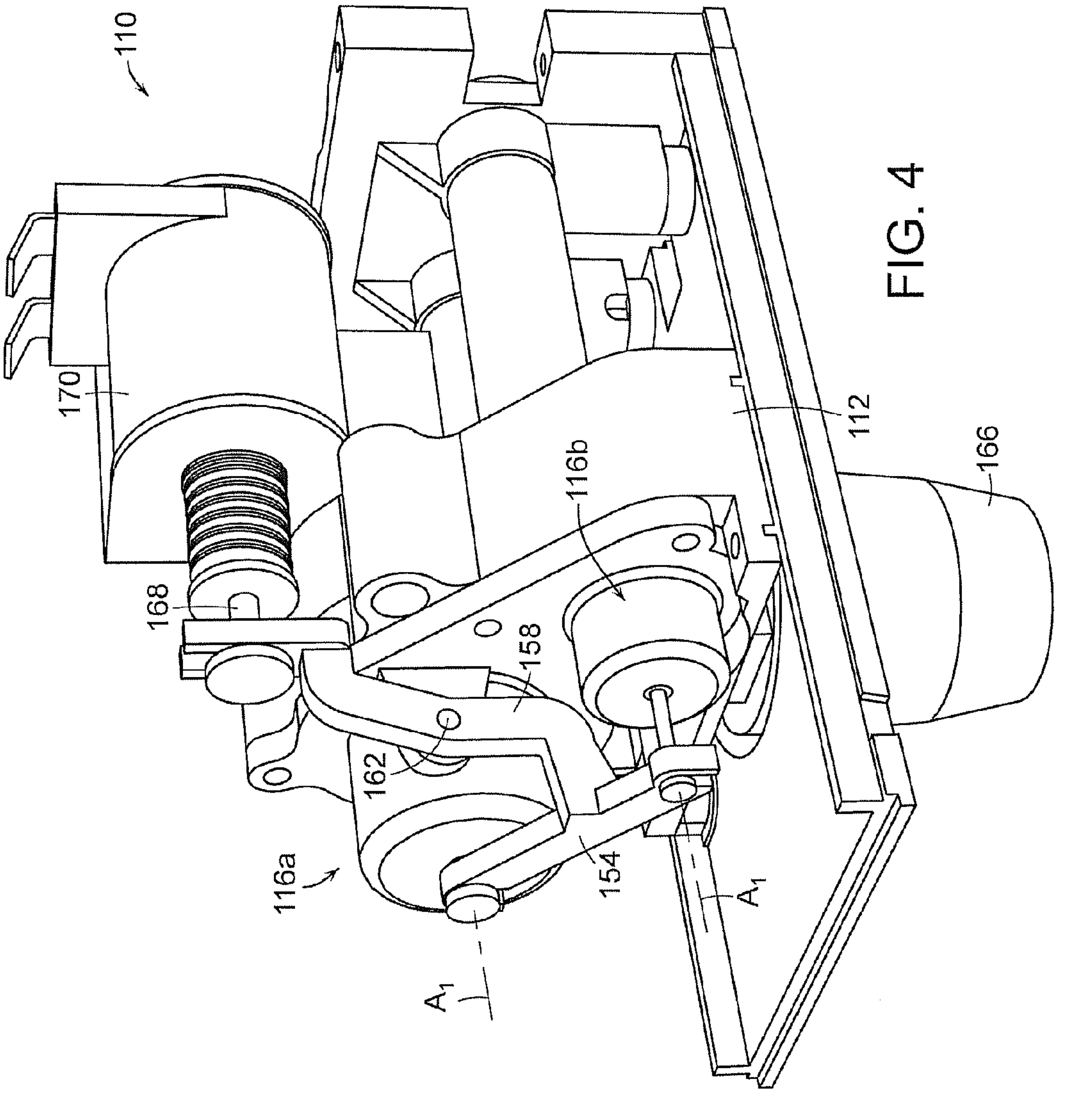
FIG. 4 is a perspective view showing an alternative embodiment of a dispensing head in accordance with the present invention.
Figure 5A:
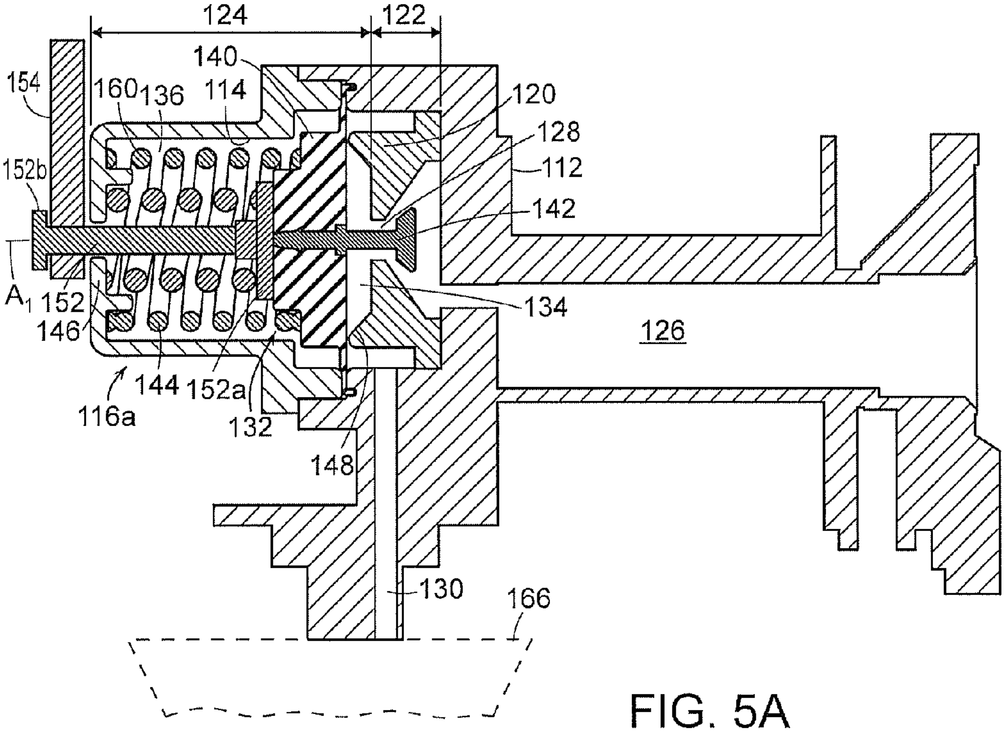
FIGS. 5A and 5B are longitudinal sectional views taken through each of the CFValves of the dispensing head shown in FIG. 4.
Figure 5B:
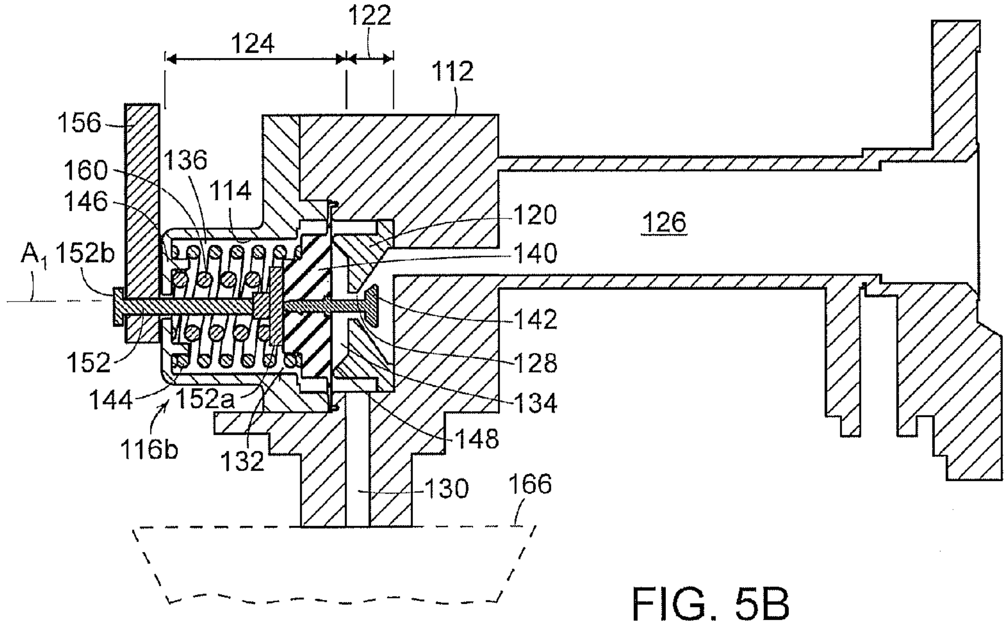
Figure 6:
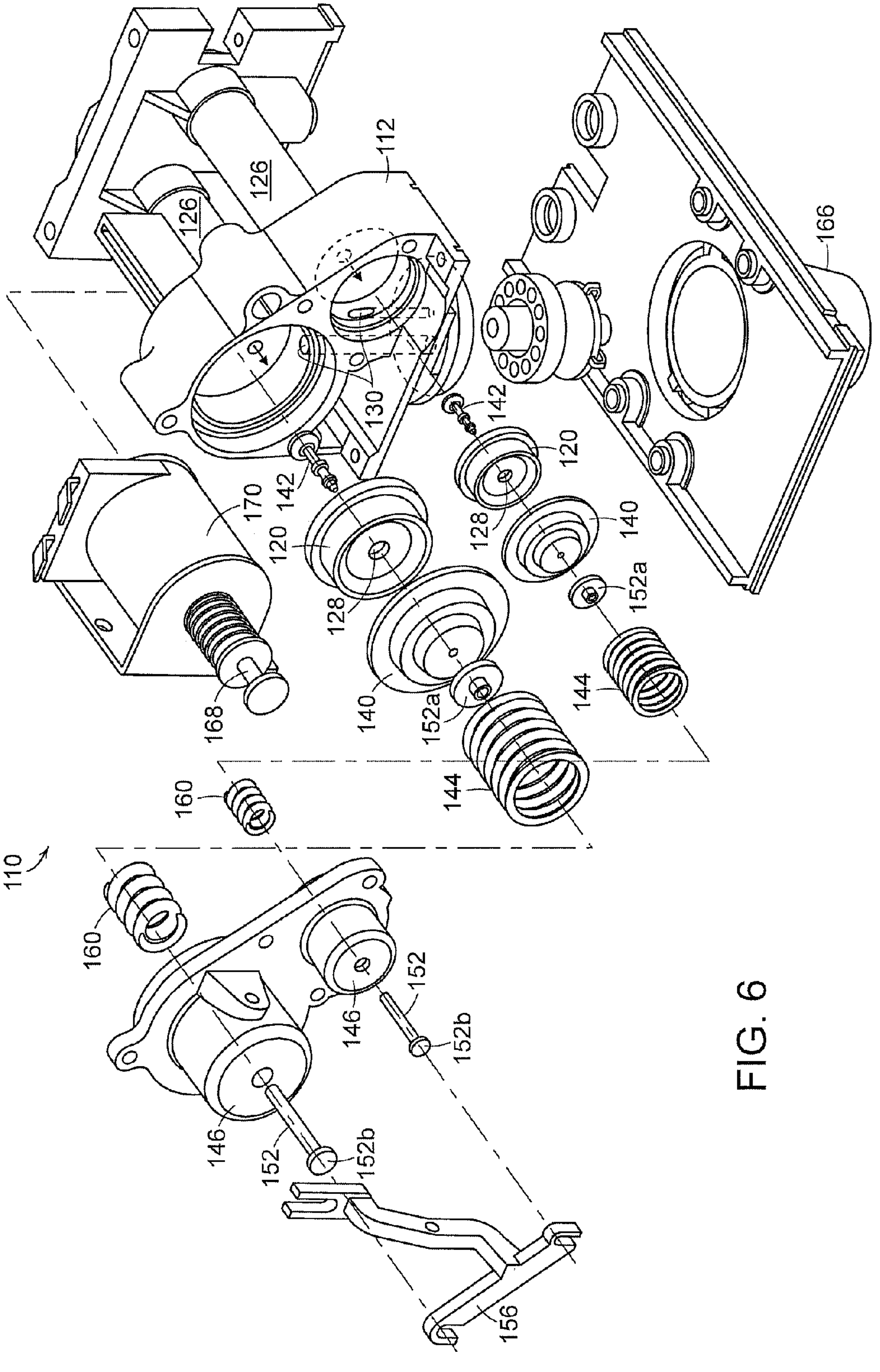
FIG. 6 is an exploded perspective view of the components of the dispensing head of FIG. 4.

An alternative embodiment of a dispensing head in accordance with the present invention is depicted at 110 in FIGS. 4-6. A housing 112 defines multiple compartments 114 aligned on parallel axes $A_1$. CFValves 116A, 116B are arranged in the compartments 114. The CFValves comprise barrier walls 120 extending across the axes $A_1$ to subdivide the compartments into head sections 122 and base sections 124. The barrier walls have central ports 128 aligned on the axes $A_1$, and integral sealing rings 148.

Modulating assemblies 132 internally subdivide the base sections 124 into liquid chambers 134 and spring chambers 136. The modulating assemblies have throttle pins 142 projecting along axes $A_1$ through the ports 128 into the head sections 122, and flexible diaphragms 140 which support the modulating assemblies for movement in opposite directions along the axes $A_1$.

First springs 144 in the spring chambers 136 are confined between the diaphragms 140 and end walls 146 of the housing 112. At inlet liquid pressures below selected threshold levels in the head sections 122, the first springs 144 maintain the modulating assemblies 132 in closed positions with their diaphragms 140 pressed against the sealing rings 148 on the barrier walls 120, thereby preventing liquid flow from the head sections via ports 128 into the liquid chambers 134. The first springs 144 yieldably respond to inlet liquid pressures above the selected threshold levels in the head sections 122 by accommodating movement of the modulating assemblies 132 to open positions away from the barrier walls 120, with the diaphragms 140 spaced from the sealing rings 148. This allows liquid to flow from the head sections 122 via the ports 128 into the liquid chambers 134.

The throttle pins 142 have enlarged heads with tapered undersides that coact with tapered rims of the ports 128 to modulate the size of the flow paths through the ports as an inverse function of variations in the inlet liquid pressures. This modulating function maintains the pressures and flow rates of the liquids being delivered into the liquid chambers at substantially constant levels.

Inlets 126 in the housing 112 connect the head sections 122 to external liquid sources (not shown), and outlets 130 in the housing connect the liquid chambers 134 to a common nozzle 166 through which the several liquids are discharged.

A closure mechanism acts independently of the first springs 144 to override the modulating functions of the valves 116*a*, 116*b* by maintaining their modulating assemblies in closed positions when the inlet liquid pressures are both above and below the selected threshold levels.

The closure mechanism includes rods 152 provided at their inner ends with flat circular pads 152*a* and at their outer ends with heads 152*b*. The rods are axially movable along the axes $A_1$ between holding positions at which the pads 152*a* are in contact with the diaphragms 140 of the modulating assemblies, and deactivated positions at which the pads are spaced from the diaphragms. Second springs 160 surround the rods 152 and are arranged concentrically within the first springs 144. The second springs 160 are captured between the pads 152*a* and the housing walls 146. The compressive forces of the second springs 160 override that of the first springs 144, and are sufficiently high to act via the rods 152 to hold the modulating assemblies 132 in their closed positions irrespective of whether the inlet liquid pressures are above or below the selected threshold levels.

The heads 152*b* of the rods 152 are mechanically coupled to a cross bar 156 forming the foot of a lever 158 pivotally connected to the housing 112 at 162. Lever 158 has a forked upper end mechanically coupled to the operating pin 168 of an electrically actuated solenoid 170.

Energizing the solenoid 170 serves to rotate the lever 158 in a clockwise direction, thereby overcoming the compressive forces of the second springs 160, resulting in the rods 152 being axially shifted from right to left as viewed in FIGS. 5A and 5B. This serves to withdraw the pads 152*a* from contact with the diaphragms 140, which frees the modulating assemblies 132 to move to open positions in response to liquid inlet pressures above the selected threshold levels.

Alternatively, instead of being remotely operated by solenoid 170, the lever 158 may be manually operated. Also, although each embodiment has been shown to include two CFValves, it will be understood that additional valves could be added and operated in similar tandem fashion.

In light of the foregoing, it will now be appreciated by those skilled in the art that in accordance with the present invention, multiple CFValves are arranged in tandem to deliver modulated liquid flows to a common nozzle or the like. The valves operate to insure that liquids are delivered at substantially constant pressures and flow rates, irrespective of variations in liquid inlet pressures and viscosities. The dimensions and physical characteristics of internal components, e.g., flexibility and resilience of the diaphragms 40, 140, dimensions of the ports 28, 128 and throttle pins 42, 142, compressive forces of the springs 44, 144, etc. are all factory preset and thus not susceptible to on site tampering.

We claim:

1. A dual function liquid dispensing apparatus comprising:

a) a housing defining multiple compartments aligned on parallel axes;

b) constant flow valves arranged in said compartments, said constant flow valves comprising:

(i) barrier walls extending across said axes to subdivide said compartments into head sections and base sections;

(ii) ports in said barrier walls;

(iii) modulating assemblies internally subdividing said base sections into liquid chambers and spring chambers, said modulating assemblies having throttle pins projecting along said axes and through said ports into said head sections, and having flexible diaphragms supporting said modulating assemblies for movement in opposite directions along said axes;

(iv) springs in said spring chambers, said springs being responsive to inlet liquid pressures in said head sections below threshold levels to maintain said modulating assemblies in closed positions against said barrier walls and to thereby prevent liquid flow from said head sections via said ports into said liquid chambers, said springs being yieldably responsive to inlet liquid pressures in said head sections above said threshold levels to thereby accommodate movement of said modulating assemblies to open positions away from said barrier walls, with an accompanying liquid flow from said head sections via said ports into said liquid chambers, and with said throttle pins serving to modulate the size of the flow paths through said ports as an inverse function of variations in said inlet liquid pressures above said threshold levels, whereby the pressures and flow rates of the liquids delivered to said liquid chambers are maintained at a substantially constant levels;

c) inlets in said housing for connecting said head sections to external liquid sources;

d) outlets in said housing for connecting said liquid chambers to a common nozzle;

e) closure means acting independently of said springs for maintaining each said modulating assemblies in said closed positions when said inlet liquid pressures are both above and below said threshold levels; and f) operating means for deactivating said closure means to thereby free said modulating assemblies for movement to said open positions in response to liquid inlet pressures in said head sections above said threshold levels.

2. The liquid dispensing apparatus of claim 1 wherein said closure means comprises rods axially movable between holding positions in contact with and maintaining said modulating assemblies against said barrier walls, and a deactivated positions spaced from said modulating assemblies.

3. The liquid dispensing apparatus of claim 2 wherein said rods are aligned with and are axially shiftable along said axes.

4. The liquid dispensing apparatus of claims 2 or 3 wherein said rods are mechanically interconnected and resiliently maintained in said holding positions by a second spring arranged externally of said housing and having a closure force exceeding the combined closure forces of said first mentioned springs.

5. The liquid dispensing apparatus of claim 4 wherein said operating means comprises a manually operable lever operatively connected to said rods.

6. The liquid dispensing apparatus of claim 4 wherein said operating means comprises a remotely operable electrically actuated solenoid operatively connected to said rods.

7. The liquid dispensing apparatus of claims 2 or 3 wherein said rods are resiliently maintained in said holding positions by second springs surrounding said rods and arranged concentrically within said first mentioned springs.

8. The liquid dispensing apparatus of claim 7 wherein said operating means comprises a manually operable lever operatively connected to said rods.

9. The liquid dispensing apparatus of claim 7 wherein said operating means comprises a remotely operable electrically actuated solenoid operatively connected to said rods.

* * * * *